(12) United States Patent
Kawai

(10) Patent No.: US 6,792,245 B1
(45) Date of Patent: Sep. 14, 2004

(54) INFORMATION REPRODUCING APPARATUS AND BROADCASTING SYSTEM

(75) Inventor: Eiji Kawai, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 09/286,925

(22) Filed: Apr. 6, 1999

(30) Foreign Application Priority Data

Apr. 10, 1998 (JP) .......................................... 10-099678

(51) Int. Cl.⁷ ............................................... H04H 1/00
(52) U.S. Cl. ................... 455/3.01; 455/3.02; 455/3.06; 455/66.1; 725/140; 725/132; 725/152
(58) Field of Search ............................. 455/3.01, 3.02, 455/3.06, 66.1; 725/34, 50, 140, 132, 152; 386/46, 95, 125

(56) References Cited

U.S. PATENT DOCUMENTS

| | | | |
|---|---|---|---|
| 3,696,297 A | * 10/1972 | Otero ......................... 380/241 |
| 3,886,302 A | * 5/1975 | Kosco ......................... 380/211 |
| 4,430,669 A | 2/1984 | Cheung |
| 4,662,004 A | 4/1987 | Fredriksen et al. |
| 5,051,822 A | 9/1991 | Rhoades |
| 5,654,746 A | 8/1997 | McMullan, Jr. et al. |
| 5,768,539 A | * 6/1998 | Metz et al. .................. 709/249 |
| 5,857,149 A | 1/1999 | Suzuki |
| 5,881,365 A | * 3/1999 | Yang et al. .................. 455/103 |
| 5,951,639 A | * 9/1999 | MacInnis ..................... 725/70 |
| 6,016,425 A | * 1/2000 | Bannister .................... 455/410 |
| 6,088,577 A | * 7/2000 | Yang et al. ................. 340/7.57 |
| 6,157,809 A | * 12/2000 | Kambayashi ............... 725/100 |

FOREIGN PATENT DOCUMENTS

| | | |
|---|---|---|
| CN | 95190486.8 | 2/1995 |
| EP | 0 386 467 | 9/1990 |
| EP | 0 641 095 | 3/1995 |
| EP | 0 671 730 | 9/1995 |
| EP | 0 681 298 | 11/1995 |
| EP | 0 833 513 | 4/1998 |
| GB | 2 289 782 | 11/1995 |
| WO | WO 91 15083 | 10/1991 |
| WO | WO97/30534 | 8/1997 |

OTHER PUBLICATIONS

Patent Abstracts of Japan, vol. 097, No. 007, Jul. 31, 1997 & JP 09 069817 A, Mar. 11, 1997, abstract & US 5,822,099, Oct. 13, 1998, abstract.
Patent Abstracts of Japan, vol. 097, No. 002, Feb. 28, 1997 & JP 08 280934 A, Oct. 29, 1996, abstract.

* cited by examiner

Primary Examiner—Marceau Milord
(74) Attorney, Agent, or Firm—Frommer Lawrence & Haug LLP; William S. Frommer (57) ABSTRACT

An information reproducing apparatus and method for reproducing information comprises an identification information provider for providing an identification information. A receiver receives broadcast information including broadcast identification information. The receiver includes a comparer for comparing the provided identification information with the broadcast identification information; and a sorter for sorting out received broadcast information in which the provided identification information matches the broadcast identification information. The sorted out information is then output from the apparatus.

27 Claims, 9 Drawing Sheets

FIG. 9
PRIOR ART PAGER SYSTEM

INFORMATION REPRODUCING APPARATUS AND BROADCASTING SYSTEM

BACKGROUND OF THE INVENTION

The present invention relates to an information reproducing apparatus for reproducing information from a recording medium, and a broadcasting system for broadcasting information.

Heretofore, there have been proposed various systems for receiving and loading information into various hardware terminals for use. Such systems have been available in many forms. First, reproducing systems for reproducing stored information are available. These systems include playback apparatuses for playing back information stored on a storage medium, such as a compact disk (CD), mini disk (MD), digital audio tape (DAT), cassette tape, video tape, or the like. Such systems also include TV game machines and portable game machines that load prestored gaming information from an appropriate storage medium and utilize the stored information for playing a game.

Recording/reproducing systems have also been proposed in which in addition to the reproduction function, a recording function is provided with the apparatus. Such recording/reproducing apparatus include MD or DAT recorders, cassette decks, video cassette decks, radio cassette recorders, TV sets with built-in video cassette decks, and video cassette decks with built-in decoders, and the like. These systems comprise a combination of a hardware terminal for loading prestored information from a storage medium, and an added recording function to record information to the recording medium. These systems also may include the ability to receive information distributed through a radio/wire transmission system and to record this information on the recording medium, or to immediately reproduce this information.

There have also been proposed systems, including TV, radio (FM, AM), CATV, pagers, portable telephones, and personal handphone systems (PHS), for distributing and receiving information through a combination of radio transmission and wire circuit broadcasting networks. These systems include receiving terminals for viewing and listening to received broadcast information at substantially the same time that the information is distributed and received, in a real time manner.

Figure 9:
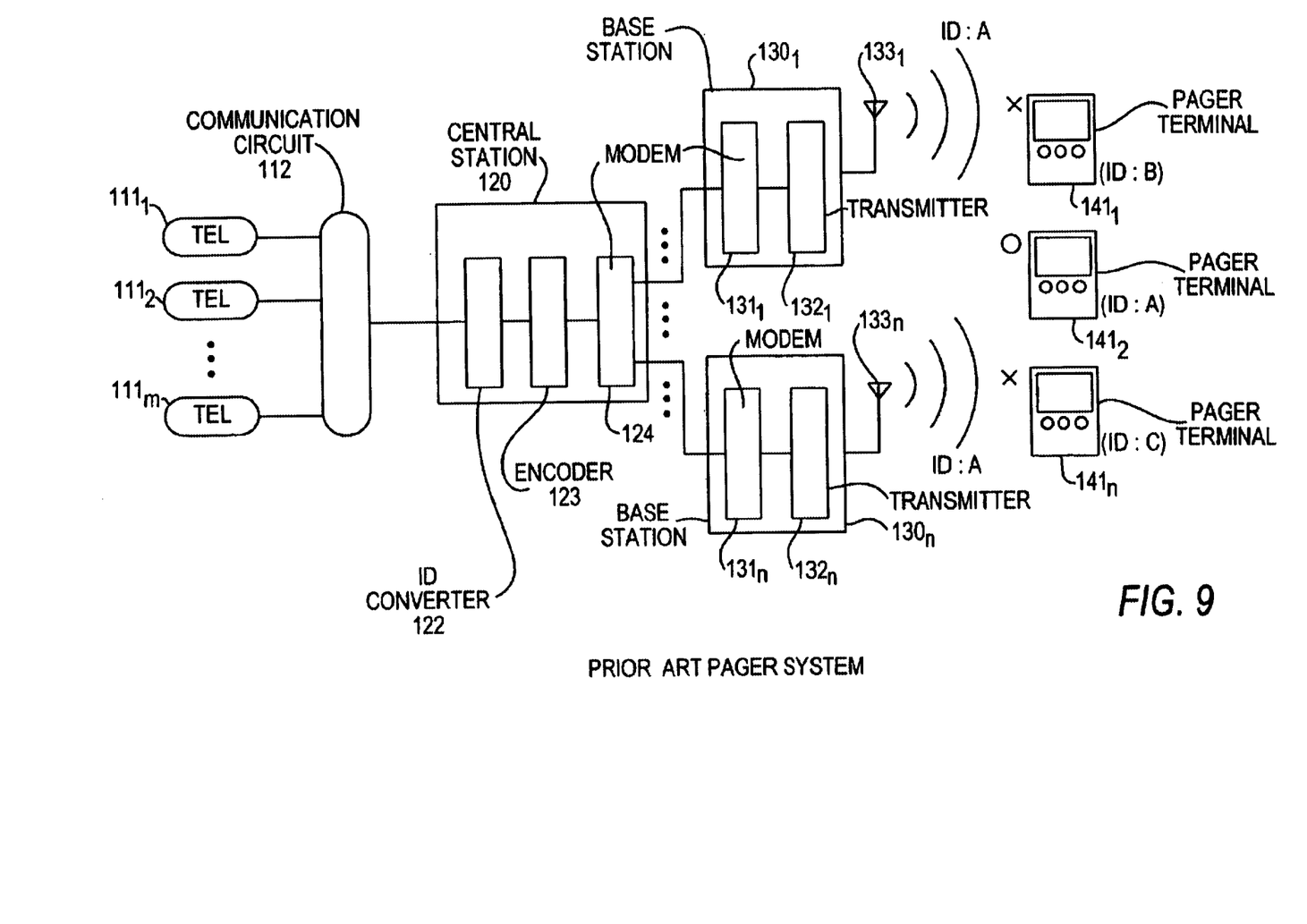
FIG. 9 is a block diagram depicting the structure of a prior art pager system.

Pager systems for transmitting data to pager terminals have also been proposed to be used as broadcasting systems. To allow only desired pagers to receive various information, the broadcasting system is designed to simultaneously broadcast data including the various information with ID data indicative of the identification of a particular pager that is to receive the broadcast data added thereto as identification information. A prior art pager system employing such ID information is shown in FIG. 9 of the accompanying drawings. As shown in FIG. 9, when a transmitting party desires to initiate communication with at least one particular pager, the transmitting party dials a desired number associated with the desired pager on one of a plurality of pushbutton dialing telephone sets $111_1$–$111_m$. Multiple numbers may be dialed at once, one on each pushbutton dialing telephone set. The dialed number is forwarded via a communication circuit 112, to a central station 120, and is converted by an ID converter 122 to a pager terminal ID address indicative of a particular pager to be addressed. The pager terminal ID address is then encoded by an encoder 123, and is transmitted by a MODEM 124 to a plurality of base stations $130_1$–$130_n$. MODEMS $131_1$–$131_n$ receive the data transmitted from central station 120 in each base station $130_1$–$130_n$. Transmitters $132_1$–$132_n$ then simultaneously transmit the data by modulated broadcast waves through antenna $133_1$–$133_n$. The transmitted data includes the pager terminal ID information including data received from the central station.

A plurality of pager terminals $141_1$–$141_n$, each having a respective identification ID unique thereto, are provided for receiving the broadcast data transmitted through antenna $131_1$–$131_n$. Of the pager terminals $141_1$–$141_n$ which have received the transmitted data including the ID information from one of base stations $130_1$–$130_n$, only the one of the pager terminals whose unique internal ID agrees with the ID received as part of the transmitted data is addressed, and is enabled to download, store and interpret the transmitted data. Thus, each pager includes a unique ID associated therewith, and downloads only information specifically intended for that particular pager.

However, each of these prior art systems suffers from at least one of the following problems:

While systems in which prestored gaming or other information is loaded into terminals for use for playing a game or the like can handle and reproduce a large amount of data, including image and sound data, these systems are not able to receive and handle real time information. Thus, there is no way for a user to receive and use the most up to date information. Prestored gaming or other information cannot be updated on a real time basis. Users must go to a store or other retail outlet location to buy updated prestored information on a new recording medium, for example. This new recording medium is similarly likely not to have the most up to date information.

On the other hand, systems that are adapted to receive distributed broadcast information through a radio or wire circuit broadcast system having reception systems provided at terminals for viewing and listening to contents at substantially the same time that the contents are distributed can retrieve and display information on a real time basis. However, these systems can only receive, process and display a small amount of information at one time, thus limiting the ability to receive and display complicated image and sound data. Furthermore, a permanent facility is required for broadcasting and distributing the information. Finally, users are generally charged a fixed rate for use of the broadcast service, and are not charged based upon the amount of information actually received, processed and displayed.

Systems which include a recording function in addition to a hardware terminal for loading prestored information or that include a function to receive information distributed through a radio and wire circuit have an increased ability to receive more extensive up-to-date information. These systems including a recording function can record information received from broadcasted information distributed through the radio or wire broadcast system, and can replay this information at any future desired time. However, though such a time-shifting capability (i.e. replay of information at a later time) improves the amount of information that can be received and displayed at near real time, it is only the received broadcast information that is reproduced to a user in the simple reproducing apparatuses. The amount of information distributed through the radio or wire broadcast signal is the same as during any other broadcast, and the information may not be able to be displayed on a real time basis if it takes the information a long time to be broadcast and received. In other words, because the information is being received from a broadcast, the amount of information that can be received is limited. Thus, to display complicated data, a long time for downloading might be necessary. In addition, a permanent facility is still required to distribute and broadcast the information, and users are only charged a fixed rate for the broadcast service, as noted above, rather than on a use basis.

It would be beneficial to provide an improved information reproducing and broadcasting system that overcomes the drawbacks of the prior art.

OBJECTS OF THE INVENTION

It is therefore an object of the invention to provide an improved information reproducing apparatus and broadcasting system.

Another object of the invention is to provide an improved information reproducing apparatus and broadcasting system that allows for the downloading and processing data by a plurality of reproducing apparatuses on a real time basis.

A further object of the invention is to provide an improved information reproducing apparatus and broadcasting system including hardware terminals having prestored software information therein that can process a large amount of information and can also process additional information on a real time basis.

An additional object of the invention is to provide an improved broadcasting system that allows for users of a particular prestored information to receive broadcast information, irrespective of the actual terminal ID.

A still further object of the invention is to provide an improved information reproducing apparatus and broadcasting system that can charge users based upon the amount of information used, rather than on a fixed rate.

Still other objects and advantages of the invention will in part be obvious and will in part be apparent from the specification and the drawings.

SUMMARY OF THE INVENTION

Generally speaking, in accordance with the invention, an improved information reproducing apparatus for reproducing information from a recording medium is provided with a detector for detecting identification information from the recording medium. A receiver for receiving a broadcast of information to which broadcast identification information is added is also provided, and further included is a determining circuit for determining whether identification information from the received broadcast signal corresponds to the identification information detected from the recording medium. A storage memory is provided for storing downloaded broadcast information that is downloaded by the information reproducing apparatus if the identification information from the broadcast signal corresponds to the identification information detected from the recording medium, and an output apparatus for outputting information stored in the storage memory is also included.

Further in accordance with the invention, a broadcasting system is provided with an identification information manager for managing identification information added to information to be broadcast. A broadcasting network is also provided for broadcasting information to which identification information has been added by the identification information manager. An information reproducing apparatus for reproducing information from a recording medium is also provided. The information reproducing apparatus further includes a receiver for receiving broadcast information to which identification information has been added from the broadcasting system, a detector for detecting identification information from the recording medium, a sorter for sorting out and selecting received broadcast information in which the identification information added thereto is in agreement with the identification information detected from the recording medium, and an output apparatus for outputting information sorted out and selected by the sorting means.

BRIEF DESCRIPTION OF THE DRAWINGS

For a more complete understanding of the invention, reference is made to the following description and accompanying drawings in which.

DETAILED DESCRIPTION OF THE PREFERRED EMBODIMENTS

Figure 1:
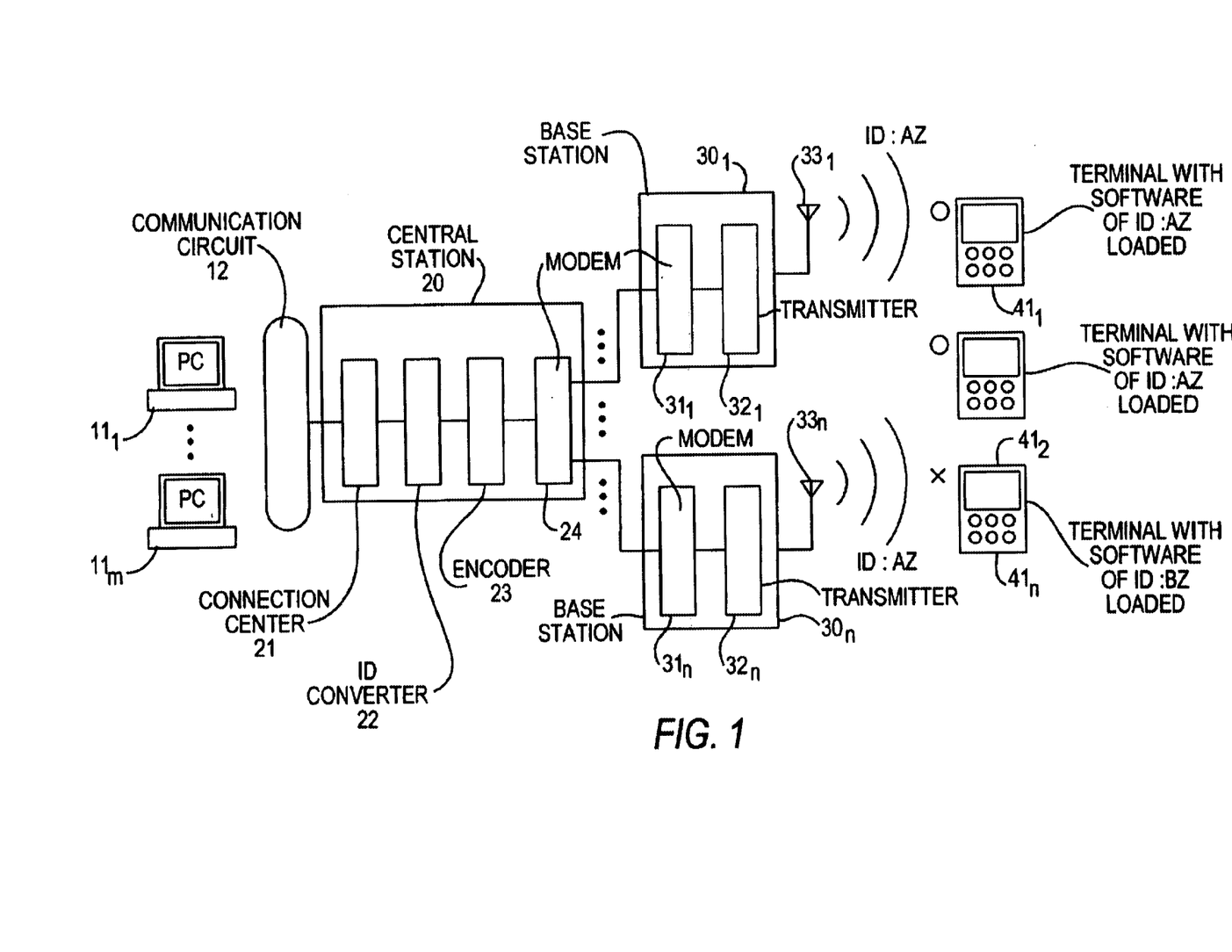
FIG. 1 is a block diagram depicting the structure of an information reproducing apparatus constructed in accordance with the invention.

Referring first to FIG. 1, a broadcasting system constructed in accordance with a first embodiment of the invention is shown and comprises a plurality of input devices $11_1$–$11_m$ connected to a communication circuit 12. Communication circuit 12 supplies an output from each of the input devices to a central station 20 for processing. Each of the input devices $11_1$–$11_m$ comprises a personal computer (PC), for example, and is supplied with information in the form of text characters or other input information by a user or other automated information provider, for example. Dedicated software for entering, editing, and transmitting information may be preinstalled in each of the input devices. In addition to transmitting input information from each input device, an ID code unique to each input device is transmitted along with the input information from each input device. Communication circuit 12 comprises a general analog circuit, a telephone network, a packet network such as an ISDN (Integrated Services Digital Network), or an OCN (Open Computer Network) or the like.

Central station 20 includes a connection center 21 for managing data received from input devices $11_1$–$11_m$, an ID converter 22 for effecting ID conversion on data forwarded from connection center 21, an encoder 23 for encoding data received from ID converter 22 according to a predetermined encoding process, and a MODEM 24 for converting encoded data received from the encoder 23 to serial data of a predetermined format and for transmitting the serial data from central station 20.

Connection center 21 of the central station checks the ID codes transmitted from each input device $11_1$–$11_m$ to insure that each of these ID codes, and thus each of the associated input devices, is currently indicated as being registered with central station 20 and effective, and thus able to transmit data through the central station. The connection center also checks received data and ID's to determine if the information received from a particular input device is associated with a particular predetermined distribution schedule, and also performs a quality check on the data contents to insure proper receipt of the data. The ID converter identifies and converts identification information (IDs) indicative of receiving units that are to receive information from a particular input device, to be added as identification information to the data received from an associated input device from connection center 21 according to a predetermined process. These LDs are not associated with a particular receiving unit, but rather associated with particular information (e.g. software programs) that may be stored on a storage device at each of one or more receiving units.

Encoder 23 then receives the data forwarded from each particular input device, and the converted ID information associated therewith, indicative of information stored at one or more receiving units that are to receive the information to be broadcast if the one or more receiving units includes the predetermined information (including the associated ID), and encodes the data and ID information that has been converted by ID converter 22, according to a predetermined process. MODEM 24 receives the data encoded by encoder 23, converts the encoded data into a serial data stream according to a predetermined process, and transmits the converted data to each of a plurality of base stations $30_1$–$30_n$.

The broadcasting system includes the plurality of base stations $30_1$–$30_n$ for transmitting and broadcasting data received from central station 20 through a plurality of respective antennas $33_1$–$33_n$, to a plurality of hardware terminals $41_1$–$41_n$. Each of these hardware terminals acts as a receiving unit for receiving data transmitted from each of antennas $33_1$–$33_n$ through a radio broadcast system. Each of base stations $30_1$–$30_n$ has a respective MODEM $31_1$–$31_n$ for receiving the transmitted serial data stream from modem 24 of central station 20, and a respective transmitter $32_1$–$32_n$ for transmitting data received at the respective modem through a broadcast system. Each transmitter $32_1$–$32_n$ receives the data from the respective MODEM $31_1$–$31_n$ and processes, e.g., modulates, the data for transmission from the respective antenna $33_1$–$33_n$ through the radio broadcast system. Antennas $33_1$–$33_n$ transmit the modulated signals from the respective base stations $30_1$–$30_n$ through the radio broadcast system.

Hardware terminals $41_1$–$41_n$, acting as receiving units, each store at least one of an ID code acquired along with information prestored in the hardware terminal, or an ID code arbitrarily established at each of the hardware terminals $41_1$–$41_n$. Each hardware terminal receives data transmitted from base stations $30_1$–$30_n$ on a real time basis only when the ID code stored at the hardware terminal agrees with the ID added to the data transmitted from the base stations $30_1$–$30_n$.

The flow of data through the broadcasting system constructed in accordance with the invention will now be described.

An information provider or transmitting party enters information to be transmitted in the form of text characters or the like through one of input devices $11_1$–$11_m$. The data entered through each of the input devices $11_1$–$11_m$ is sent via communication circuit 12, which may be a general analog circuit, a telephone network, a packet network such as an ISDN, or an OCN, to connection center 21 of central station 20 as noted above.

Connection center 20 checks ID codes in the data received from each of the input devices, checks the received data and ID codes for matching with a prepared predetermined distribution schedule, and also checks the contents of the data for quality, all as described above. Then ID converter 22 identifies and converts an ID indicative of information stored at one or more receiving units to receive transmitted data, and inserts this identified and converted ID in the data to be transmitted. The data and ID that have been converted by ID converter 22 is encoded by encoder 23, and the encoded data is transmitted via MODEM 24 to each of the base stations $30_1$–$30_n$. In each of the base stations, the associated MODEM $31_1$–$31_n$ receives the data from the central station 20, and the associated transmitter $32_1$–$32_n$ modulates the data and transmits the modulated data through the associated antenna $33_1$–$33_n$. In this manner, the data entered by the information provider through one of the input devices $11_1$–$11_m$ is transmitted as encoded information with an ID code included therein simultaneously from each of the base stations.

Hardware terminals $41_1$–$41_n$ receive the data transmitted from base stations $30_1$–$30_n$ through the radio broadcasting system and extract an ID code therefrom. An ID code is also retrieved from a prestored information, or is arbitrarily set, as noted above. Only when the ID code included within the data transmitted from the base stations $30_1$–$30_n$ agrees with the ID code stored in a particular hardware terminal $41_1$–$41_n$ does the particular hardware terminal download and store the data received from base stations $30_1$–$30_n$ on a real time basis. Therefore, the number of hardware terminals $41_1$–$41_n$ which simultaneously receive the data from base stations $30_1$–$30_n$ can be any number as long as each of the hardware terminals has the proper ID code stored within.

In the broadcasting system constructed in accordance with the invention, input devices $11_1$–$11_m$ may be dedicated devices, or general purpose computers running dedicated software. The managing process effected by connection center 21 in the central station is performed as a preprocessing operation. Almost all of the other infrastructure details involved in the subsequent operation of the transmission or broadcasting station of the broadcasting system may be similar to those of a conventional pager system. Therefore, the broadcasting system in accordance with the invention may be implemented easily at a low cost.

Figure 2:
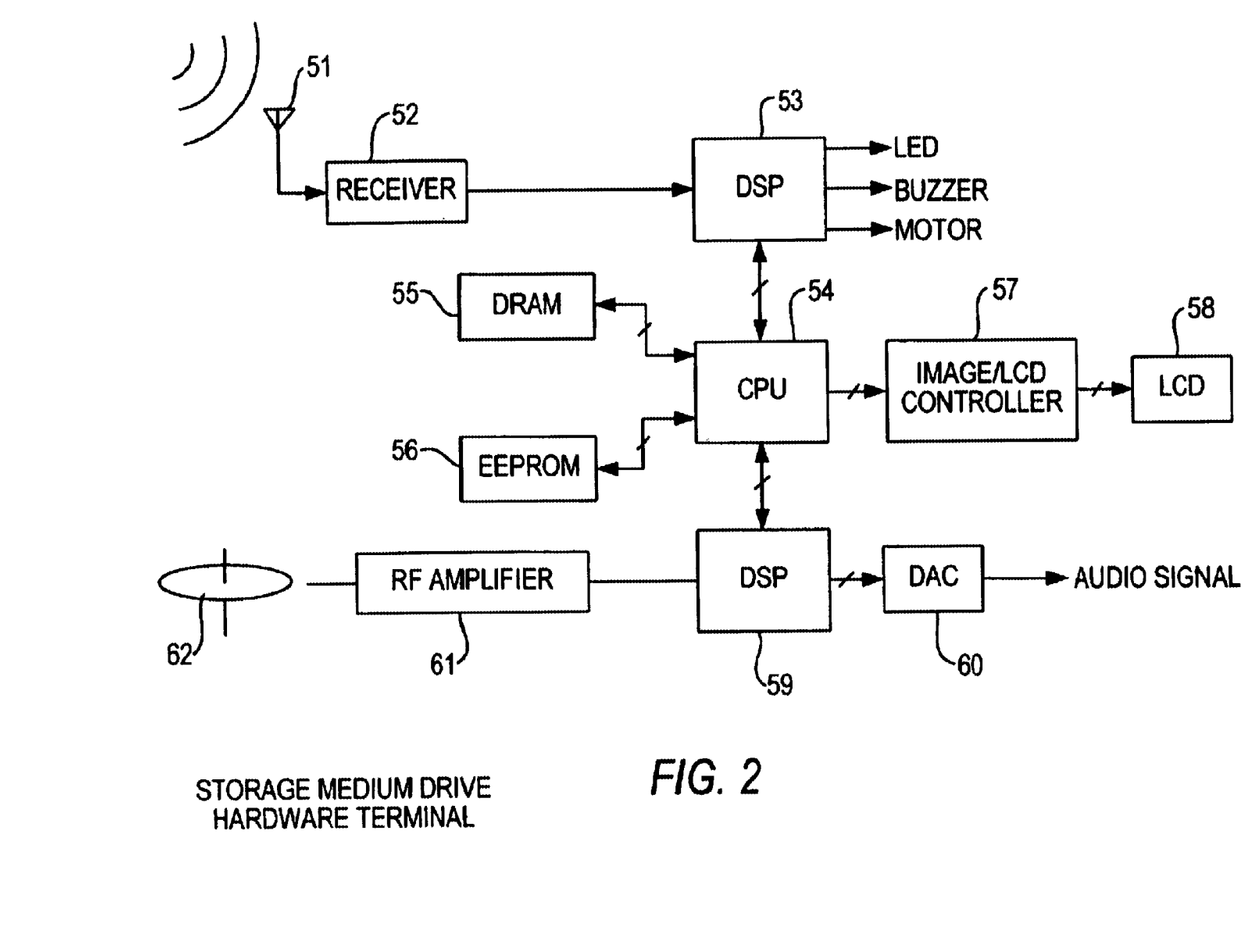
FIG. 2 is a block diagram depicting the structure of a hardware terminal constructed in accordance with a first embodiment of the invention.

The structure of each of the hardware terminals used in accordance with the broadcasting system of the invention will now be described, making reference to FIG. 2. FIG. 2 depicts a simplified block diagram of such one hardware terminal 41 constructed in accordance with the invention. Each hardware terminal comprises an antenna 51 for converting data received via a radio or other broadcast system to an electric signal, a receiver 52 for processing, e.g., amplifying and demodulating, a signal forwarded from antenna 51, and a Digital Signal Processor (DSP) 53 for effecting certain digital signal processing on data forwarded from receiver 52. During use, antenna 51 detects and converts data transmitted through the radio broadcast system to an electric signal. Receiver 52 selects a desired frequency signal from the converted electric signal detected by antenna 51, and processes, e.g., demodulates, the selected desired signal. DSP 53 is controlled by a CPU 54 to process the signal forwarded from receiver 52 by decoding the encoded data received therefrom, for example. DSP 53 also outputs control signals for an LED, a buzzer, and a motor based on the contents of the digitally processed data.

In accordance with a first embodiment of the invention, each hardware terminal 41 further comprises a storage medium drive 62 for driving and retrieving stored information from a storage medium, an RF amplifier 61 for amplifying an RF signal retrieved from the storage medium by storage medium drive 62, a Digital Signal Processor 59 for effecting certain digital processing, in accordance with control from CPU 54, on a signal forwarded from RF amplifier 61, and a Digital to Analog Converter 60 for converting a digital signal from DSP 59 to an analog signal, and for outputting the analog signal as an audio signal.

Storage medium drive 62 serves as a drive for driving a storage medium such as an MD, CD, DVD, or other storage medium, for example. Storage medium drive 62 has at least a drive unit for driving the storage medium and a pickup unit for reading data from the storage medium. RF amplifier 61 processes, e.g., amplifies and shapes the waveform of an RF signal received from storage medium drive 62. Digital Signal Processor 59 is controlled by CPU 54 to process the signal received therefrom from RF amplifier 61 by decoding encoded data received therefrom. Digital to Analog converter 60 converts a digital audio signal decoded by Digital Signal Processor 59 to an analog signal and outputting the analog signal as an audio signal.

CPU 54 of each hardware terminal controls the components of the hardware terminal, and is additionally coupled with a DRAM 55 which serves as a volatile memory for temporarily storing data, an EEPROM 56 which serves as a nonvolatile memory for keeping stored data even when the power supply is turned off, an LCD 58 which serves as a display unit for displaying characters and images, and an image/LCD controller 57 for controlling the LCD 58 based on an image output signal from CPU 54. CPU 54 executes a series of steps according to a predetermined programming sequence recorded in EEPROM 56 which serves as a nonvolatile memory for storing program data, for example. Additional, non-permanent data required for processing carried out by CPU 54, such as the ID read from the storage medium, are temporarily stored in DRAM 55 which serves as a volatile memory. Image/LCD controller 57 serves as a control unit for controlling LCD 58 based upon an image output signal from CPU 54. LCD 58 displays characters and images according to a control signal from image/LCD controller 57.

The portion of the hardware terminal shown in an upper section of FIG. 2, wherein various signals are output from receiver 52 and DSP 53, operates in a manner similar to a conventional pager or FM receiver. The portion of the arrangement shown in a lower section of FIG. 2, wherein an audio signal is output from RF amplifier 61, Digital Signal Processor 59, and the Digital to Audio Converter 60 operates in a manner similar to a conventional CD player, a playback-only MD player, or a DAT player.

In the block configuration of the hardware terminal shown in FIG. 2, Digital Signal Processors 53, 59 act as conventional signal processors. These Digital Signal Processors are controlled by main CPU 54, which also has coupled therewith DRAM 55, acting as a main memory, EEPROM 56 for temporarily storing ID codes that are received, and for storing real time information that is received, and the image/LCD controller 57 for displaying real time information and images from a storage medium are all controlled by CPU 54. Alternatively, received ID codes may be stored in registers in CPU 54 and Digital Signal Processors 53, 59, rather than in EEPROM 56.

The operation of a hardware terminal 41 for displaying real time information in accordance with the contents of a storage medium will now be described.

When a user loads a storage medium containing various pre-stored information into the hardware terminal, ID codes associated with the contents recorded in a TOC (Table of Contents) of the storage medium are read out therefrom by the hardware terminal. These read out ID codes are stored in EEPROM 56 or registers within CPU 54 and Digital Signal Processors 53, 59. Alternatively, these ID codes may not be read out from the storage medium, but may arbitrarily be established by the user through the manipulation of various control buttons included with the hardware terminal. ID codes entered through an input means such as control buttons may be stored in the same manner as the storage of ID codes read out from the storage medium.

Thereafter, broadcast data is received by receiver 52 via antenna 51 of the hardware terminal in real time, and an ID code included with this received information is detected. Only when the detected ID code from the received information agrees with the ID code stored in the hardware terminal (in DRAM 55, for example) is the remainder of the real time received information downloaded to be stored in EEPROM 56. This real time information which is downloaded to EEPROM 56 can subsequently be read, manipulated and displayed by the user.

Figure 3:
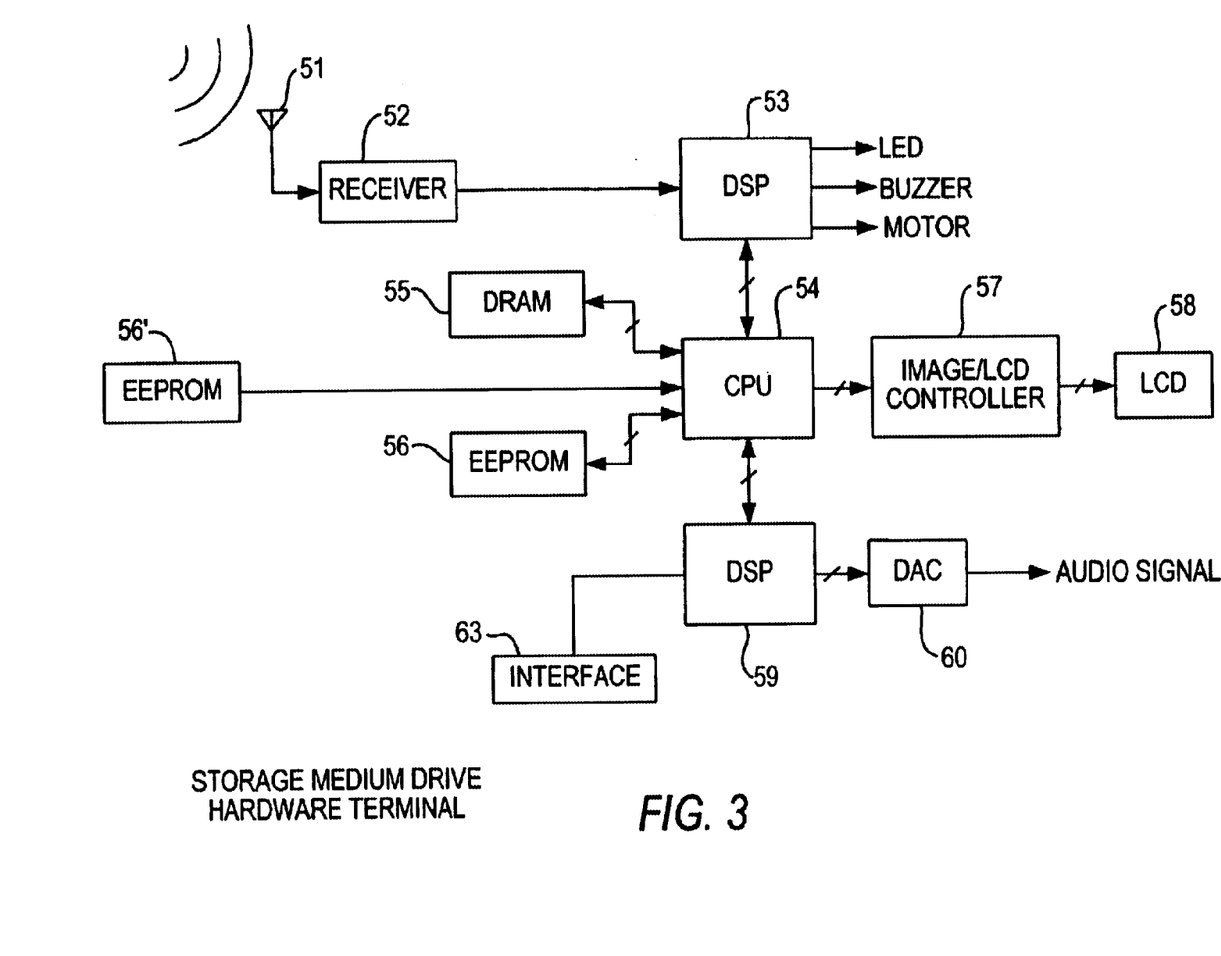
FIG. 3 is a block diagram depicting the structure of a hardware terminal constructed in accordance with a second embodiment of the invention.

In an alternative embodiment of the invention, a storage medium is not loaded into the hardware terminal. Rather, the hardware terminal is coupled with an information-providing apparatus, and information is transferred from the information providing apparatus to the hardware terminal. The internal structure of such a hardware terminal according to this alternative embodiment is shown in FIG. 3. In this alternative embodiment elements similar to those in the prior embodiment of FIG. 2 are given like reference numerals.

As is shown in FIG. 3, the hardware terminal of this alternative embodiment does not include storage medium drive 62 or RF amplifier 61. Rather, an interface 63 is provided for coupling with an information providing device, and additional EEPROM memory is provided at 56' for storing information received via interface 61. After information is downloaded into EEPROM 56', operation proceeds as in the first embodiment, with all information being read from EEPROM 56' instead of from the storage medium. Thus, the ID code is read from EEPROM 56' rather than from a storage medium. Interface 63 allows the hardware terminal to be electrically coupled with the information providing device.

Figure 4:
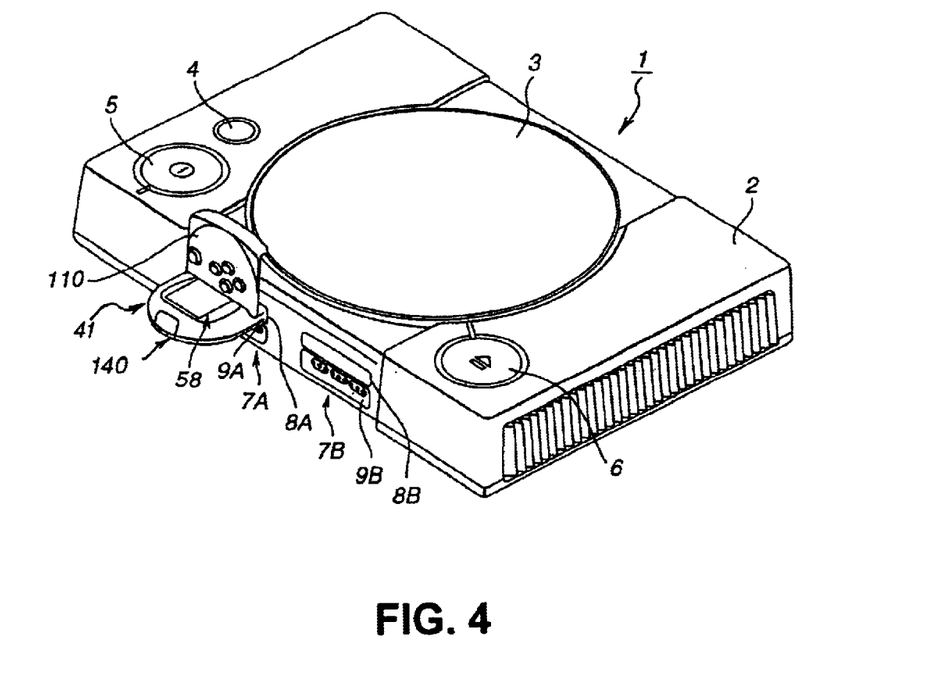
FIG. 4 is a perspective view of the connection of a hardware terminal coupled with an information providing device.

As is shown in FIG. 4, the hardware terminal 41 may be coupled with an information providing device, in this case, a video game playing device 1. Video game device 1, acting as a master device, is shown with a hardware terminal 41 constructed in accordance with the present invention loaded thereon. Video game device 1 is provided with a main body portion 2 housed in a casing, and a disc loading unit 3 adapted for loading an optical disc is positioned in a center area thereof. This optical disc may comprise a CD-ROM as a recording medium, the optical disc having an application program recorded thereon to be executed by video game device 1. The video game device reads out the game program recorded on the optical disc, and executes the game program in accordance with instructions from a user (game player). Game execution includes controlling the progress of the game, display and sound. Main body portion 2 of video game device 1 also includes in a preferred embodiment, a reset switch 4 for optionally resetting the game, a power switch 5, a disc actuating switch 6 for loading the optical disc, and two slots 7A and 7B. The recording medium for supplying the application program is not limited to an optical disc; and the application program may also be supplied via a communication network or via other non-volatile storage media.

Two actuating devices may each be selectively connected to either one of slots 7A and 7B so that two users can play a combat or other two player, or head-to-head game. Hardware terminal 41 embodying the present invention can also be inserted in either of slots 7A and 7B. Although FIG. 1 shows two slots 7A and 7B, the number of slots may also be other than two. Slots 7A and 7B are designed having two tiers. In the upper tier of each slot is provided a hardware terminal insertion unit 8A and 8B, respectively, in which a hardware terminal may be selectively inserted. In the lower tier of each slot 7A or 7B is provided a controller connection unit (jacks) 9A or 9B, respectively, for connecting a connection terminal of each actuating device or controller to the video game device.

The insertion slots of insertion units 8A and 8B are formed as horizontally elongated rectangles whose upper side corners are rounded more prominently than the lower side corners thereof (not shown) to prevent the hardware terminal from being inserted in an incorrect orientation. Hardware terminal insertion units 8A and 8B are also provided with a shutter for protecting a connection terminal provided therein (not shown). Controller connection units 9A and 9B are formed of horizontally elongated rectangles whose lower side corners are rounded more prominently than the upper side corners thereof to prevent the connection terminal of the actuating device or controller from being inserted in an incorrect orientation. Additionally, the insertion slots of controller connection units 9A and 9B are of a different shape from hardware terminal insertion units 8A and 8B to prevent incorrect insertion of the hardware terminal portable electronic device in controller connection units 9A and 9B, and vice-versa.

Hardware terminal 41 of the present invention is shown having been inserted into memory card insertion units 8A of slot 7A on the front side of video game device 1. A lid 110 of hardware terminal 41 is in an opened position, allowing for the insertion of the hardware terminal. Hardware terminal 41 is further formed with a display 58 for displaying information thereon, as noted above, and with an infra-red transmitting and receiving unit 140 for maintaining infra-red communication with another infra-red capable device.

Figure 5:
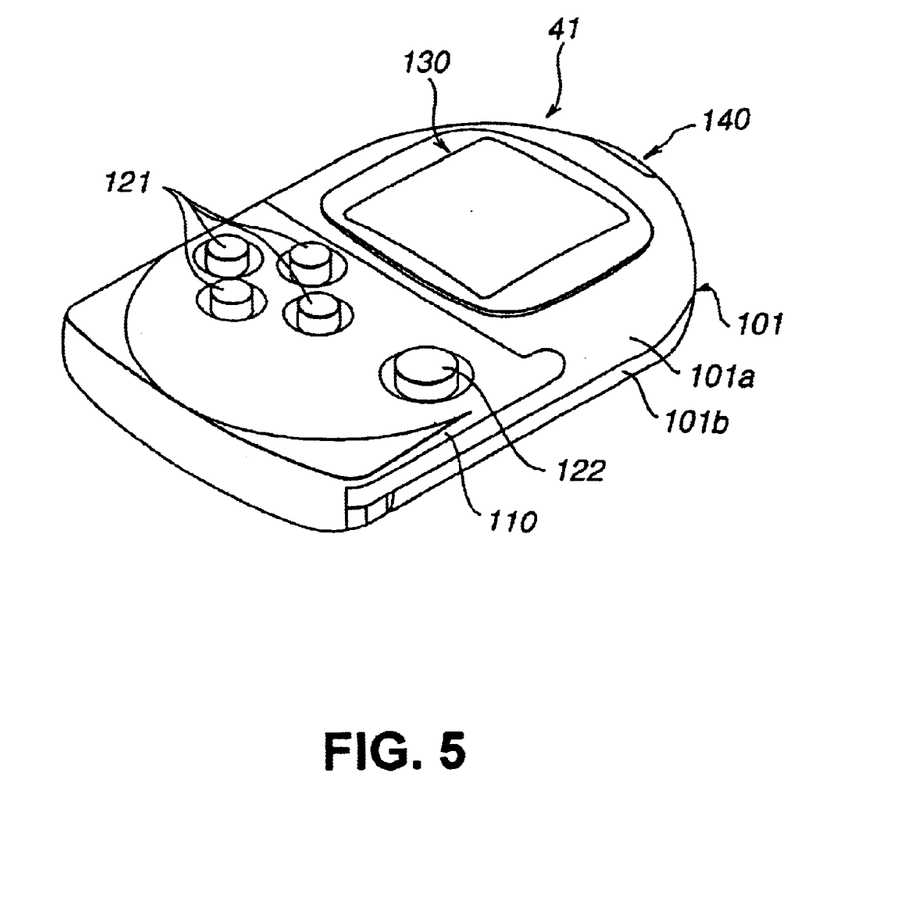
FIG. 5 is a perspective view of a hardware terminal constructed in accordance with the invention.

As is further shown in FIG. 5, lid 110 of hardware terminal 41 is provided with a plurality of actuator buttons 121 and 122. These actuator buttons allow the input of information into the hardware terminal by transferring a force provided to the actuator buttons via an actuator provided within lid 110 to one or more switch members within the hardware terminal, when the lid is in a closed position. The actuator buttons are arranged to traverse the lid, and are supported by the lid so as to be movable in a direction emerging from and receding below the upper surface of the lid, allowing a force to be translated therethrough.

Figure 6:
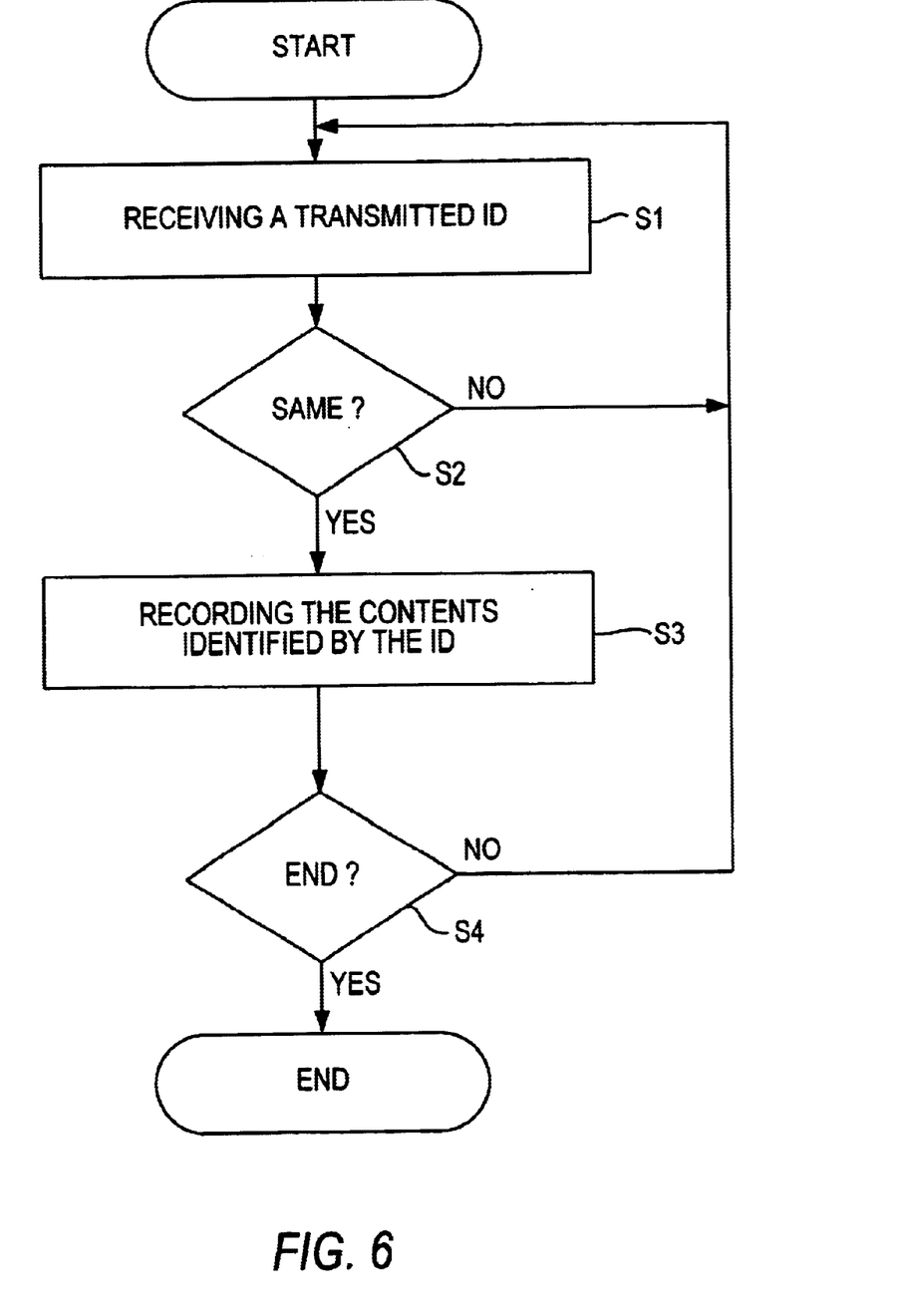
FIG. 6 is a flow chart depicting the functioning of a determiner for determining whether a stored ID code and a broadcast ID code match.

Returning once again to FIG. 2, and additionally to FIG. 6, an operation sequence for receiving and storing broadcast information by hardware terminal 41 is shown. In step S1 of FIG. 6, a transmitted ID code received by receiver 52 and extracted from the received broadcast data is sent to CPU54. In step S2, CPU 54 compares the ID code with the ID code stored in EEPROM 56. If the transmitted ID code is not the same ID code as the ID code stored in EEPROM 56, control returns to step S1 and CPU 54 receives the next transmitted ID code without downloading the received broadcast data associated with the rejected ID code. If, at step S2, it is determined that the transmitted ID code is the same ID code as the ID code stored in EEPROM 56, then in step S3, CPU 54 records the received data associated with the matching ID code. In step S4, after the recordation of the received data, CPU 54 confirms whether there is an instruction from the user to stop operation. If there is such an instruction CPU 54 stops operation. If there is no such instruction, operation returns to step S1, and CPU 54 receives the next transmitted ID code.

In accordance with the invention, the hardware terminal of the broadcasting system constructed in accordance with the invention may be used in a hybrid fashion to receive a large amount of pre-stored information from a storage medium or information providing device on other than a real time basis, and to receive a smaller amount of associated real time information depending on identification information provided with the pre-stored and real time information. This real time information may comprise additional auxiliary information, updated information, or selection information. Auxiliary information includes additional information to be provided to a user. For example, if information on a storage medium included a listing of restaurants, auxiliary information might include the names of restaurants that opened after the production of the storage medium. Thus, the information on the storage medium can be updated and added to. When a user views information from the storage medium, this auxiliary information would be provided to the user along with the information retrieved from the storage medium, at the appropriate location thereof.

Updated information might include new information about a particular restaurant, such as a new address or telephone number, new menu or specials, or any other information that might change from the time the storage medium was produced. Thus, when the original information received from the storage medium is to be output, the updated information is substituted for the older information it replaces.

Selection information allows for automatic selection of information from the storage medium. Thus, if one were in a particular city, a received broadcast selection information would indicate this city, and restaurant information for the city the user is in would be output automatically from the storage medium, rather than all of the stored information. Thus, a more personalized information output can be achieved.

Other examples of the contents of the transmitted information are general real time everyday information such as of news, weather forecasts, traffic information, stock price information, etc., or the like. Thus, real time information can be combined in many ways with pre-stored information to allow for the provision of large amounts of data along with the ability to provide real time updated data.

The contents of the storage medium, including ID code, will now be described below with respect to data stored in a disk-shaped recording medium 101, making reference to FIGS. 7A and 7B.

Figure 7A:
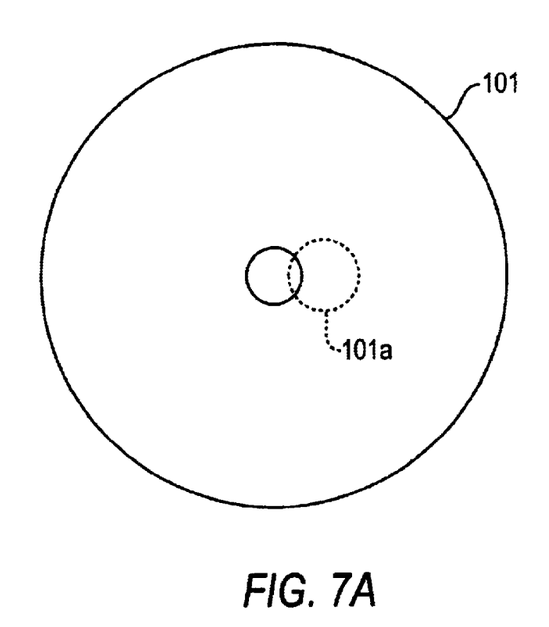
FIG. 7A is a top plan view of a recording medium of the invention indicating a table of contents area.
Figure 7B:
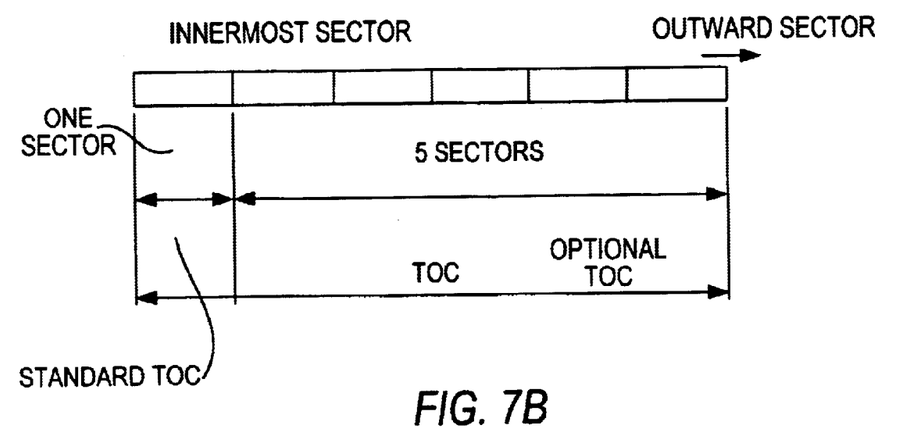
FIG. 7B depicts the structure of the table of contents area of FIG. 7A.

FIG. 7A is a plan view of a disk-shaped recording medium, such as an MD, CD or DVD, indicated at 101. In FIG. 7A, the physical position of data called TOC (Table of Contents) 101 a stored on the disk shaped recording medium is illustrated, and is positioned at a center portion of the recording medium. TOC 101a comprises data representing the contents of the data stored on the storage medium. As shown in FIG. 7B, while a standard TOC 101a includes only a general description and general location information regarding the contents of the disc, and uses only one radially innermost sector of the storage medium, TOC 101a can optionally be expanded five additional sectors at maximum. This expansion allows for additional contents information. Using these optional areas in accordance with the invention, category codes representing details of the contents stored on the storage medium are defined and are stored as ID codes therein. A disk as a whole may be represented by one ID, or alternatively a plurality of ID codes may be defined for one disk, depending on the contents thereof. Such a plurality of ID codes provide an indication of information that is recorded on the recording medium, as well as where each portion of information is recorded thereon.

When a storage medium such as disk-shaped recording medium 101 is loaded into the hardware terminal of the broadcasting system, the hardware terminal reads TOC information from the storage medium, and stores the TOC information. Then, the hardware terminal waits until an ID code stored therein agrees with an ID code associated with received real time broadcasted information. When the ID codes agree, the broadcast information is downloaded and stored in the hardware terminal as noted above.

As described above, the broadcasting system distributes real time information. The storage medium, storing a large amount of data such as image and audio data with ID codes assigned to its contents, is loaded into a hardware terminal of the broadcasting system. When an ID of data broadcast from a base station through the broadcast system agrees with an ID of the storage medium or an arbitrarily established ID, real time information is downloaded to the hardware terminal. Stated otherwise, ID codes detected from the loaded storage medium or ID codes arbitrarily established at the hardware terminal are stored in the hardware terminal. Only when an ID code of received broadcast information agrees with a stored ID code is the received broadcast information automatically downloaded, and outputted together with information stored on the storage medium, or is alternatively stored within the hardware terminal.

In the above description, the disk-shaped recording medium 101 is illustrated as the storage medium. However, the present invention is not limited to such a disk-shaped recording medium 101. Another medium such as a DAT, etc. may be used as a storage medium.

Figure 8:
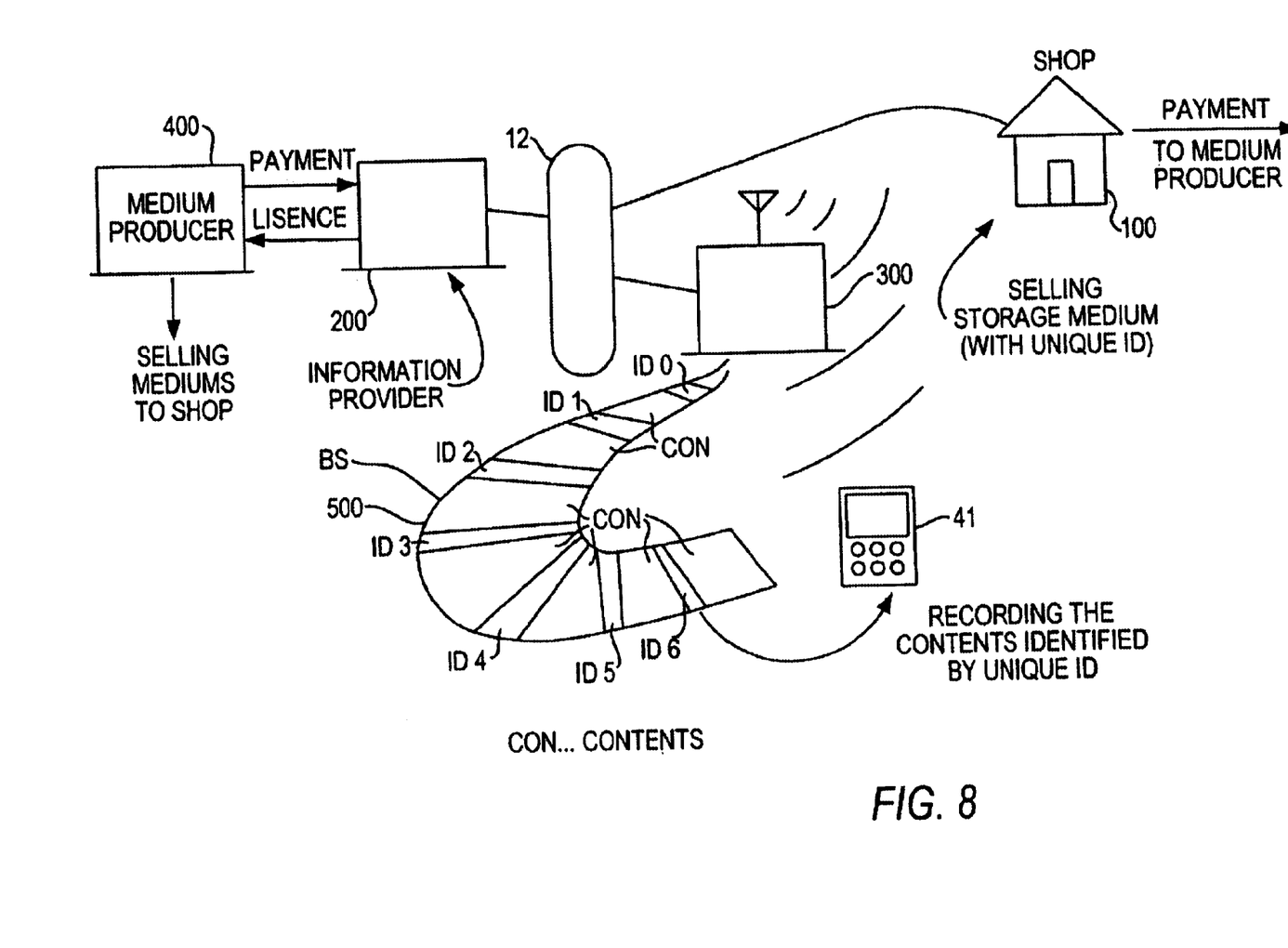
FIG. 8 depicts a broadcast system and information providing system constructed in accordance with the invention.

Referring next to FIG. 8, an information providing system constructed in accordance with the invention is shown. The information providing system includes a recording medium producer 400 that produces recording media, including ID codes thereon, as noted above. An information provider 200 provides content including the ID codes to be included on the recording media by recording media producer 400. The information provider and recording media producer may be the same or affiliated companies, or may be separate companies having a licensing agreement, or other information transfer agreement therebetween.

A retail outlet is also provided for selling recording media produced by recording media producer 400. The retail output may be an actual shop, a mail order retail output or other outlet for purchasing a recording medium. Alternatively, information provider 200 may skip the provision of the recording medium and allow the desired information to be directly downloaded from a web site or the like. Upon purchasing a recording medium, or downloading information from a web site or the like, the purchaser is charged a fee by the retail outlet or information provider, as appropriate. This fee may or may not include the right to receive future updated information.

Once information has been acquired by a user, the information is loaded into hardware terminal 41, either by placing a recording medium therein, or by downloading information thereto, as noted above. After loading the information, the ID codes associated with the loaded information are extracted from the data and stored in EEPROM Memory 56 (see FIG. 2). Information provider 200 provides broadcast information, including ID codes via communication network 12 to a broadcast center 300, as noted above in FIG. 1. The data is converted and broadcast as a bitstream 500, including various information and associated ID information. As is shown, bitstream 500 is received by hardware terminal 41, each ID code in bitstream 500 is compared with the ID or IDs stored in EEPROM 56 of the hardware terminal, and broadcast information associated with any broadcast ID that matches an ID stored in EEPROM 56 is downloaded. This downloaded information is then utilized as noted above.

Thus, a user may be charged only for recording media and updates actually purchased, rather than a fixed fee for a full delivery service. Additionally, rather than requiring a list of hardware terminals that are to receive a particular broadcast information, the information can be broadcast once, and all hardware terminals with a related stored information (including appropriate ID code) loaded at that time will receive the broadcast. An information provider can thus easily update information, and be paid by the users of the updated information.

The illustrated embodiments are for example only and the present invention is not limited to the illustrated embodiments. For example, the above broadcasting system may be constructed as a system for transmitting information through a wire circuit.

According to the present invention, as described above, a large amount of data is supplied in a storage medium, and only additional real time information is distributed by a broadcasting system. Consequently, the system according to the present invention is highly convenient, and has improved practical and entertaining capabilities. Operation of the broadcasting system is highly simplified because ID codes of both transmitted data and storage medium data are detected and information is automatically received when the detected ID codes agree with each other. Furthermore, a plurality of terminals which have heretofore been necessary for distributing information can be merged into a single unit, and new applications for broadcasting networks that have not been available thus far are made possible. Moreover, the present invention is economical because it can be achieved by simply adding a managing apparatus for managing ID codes in transmitted information as a preprocessing operation to an existing information distributing infrastructure, such as that for a pager or other broadcast system.

It will thus be seen that the objects set forth above, among those made apparent from the preceding description are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. An information reproducing apparatus for reproducing information, comprising:
   identification information providing means for providing identification information indicative of a software information in a remote unit, said software information and said provided identification information being stored at said information reproducing apparatus;
   receiving means for receiving broadcast information including broadcast identification information, said broadcast identification information being generated apart from said broadcast information and being representative of a contents of said broadcast information;
   comparing means for comparing said provided identification information with said broadcast identification information;
   sorting means for sorting out received broadcast information in which said provided identification information matches said broadcast identification information; and
   output means for outputting said sorted out information to said remote unit.

2. The information reproducing apparatus of claim 1, wherein said output means records said sorted out information on a recording medium.

3. The information reproducing apparatus of claim 1, wherein said provided identification information is retrieved from a storage medium.

4. The information reproducing apparatus of claim 3, wherein said storage medium includes additional information associated with said provided identification information.

5. The information reproducing apparatus of claim 3, wherein said provided identification information is recorded in a particular, predefined area of said recording medium.

6. The information reproducing apparatus of claim 1, wherein said provided identification information is input from an external source.

7. The information reproducing apparatus of claim 6, wherein said external source comprises user-operated means.

8. The information reproducing apparatus of claim 1, further comprising storage means for storing identification information provided by said identification information providing means.

9. The information reproducing apparatus of claim 1, wherein said provided identification information identifies the contents of associated information.

10. The information reproducing apparatus of claim 1, wherein said receiving means receives said broadcast information via a radio and/or wire circuit system.

11. A broadcasting system, comprising:
    receiving means for receiving broadcast information;
    broadcast identification managing means for adding broadcast identification information to information to be broadcast, said broadcast identification information being generated at a source different from the source of said broadcast information and being representative of a contents of said broadcast information;
    broadcasting means for broadcasting information having said broadcast identification information; and
    information reproducing means for reproducing information from a recording medium, said information reproducing means comprising:
    identification information providing means for providing identification information indicative of a software information in a remote unit, said software information and said provided identification information being stored at said information reproducing apparatus;
    receiving means for receiving said broadcast information including said broadcast identification information;
    comparing means for comparing said provided identification information with said broadcast identification information;
    sorting means for sorting out received broadcast information in which said provided identification information matches said broadcast identification information; and
    output means for outputting said sorted out information to said remote unit.

12. The broadcasting system of claim 11, wherein said provided identification information is retrieved from a storage medium.

13. The broadcasting system of claim 11, wherein said provided identification information is input from an external source.

14. The broadcasting system of claim 11, wherein said provided identification information identifies the contents of associated information.

15. The broadcasting system of claim 11, wherein said broadcast information is selected based upon said provided identification information recorded on a storage medium.

16. An information reproducing method for reproducing information by a reproducing apparatus comprising the steps of:
    providing identification information indicative of a software information in a remote unit, said software information and said provided identification information being stored at said information reproducing apparatus;
    receiving broadcast information including broadcast identification information, said broadcast identification information being generated apart from said broadcast information and being representative of a contents of said broadcast information;
    extracting broadcast identification information from said broadcast information associated therewith;
    comparing said extracted broadcast identification information with said provided identification information;
    recording said received broadcast information associated with said extracted broadcast identification information if said extracted broadcast identification information corresponds with said provided identification information; and
    outputting said broadcast information associated with said extracted broadcast identification information to said remote unit.

17. The information reproducing method of claim 16, wherein said recorded broadcast information is recorded on a recording medium.

18. The information reproducing method of claim 16, wherein said provided identification information is retrieved from said storage medium.

19. The information reproducing method of claim 18, wherein said provided identification information is recorded in a particular, predefined area of said storage medium.

20. The information reproducing method of claim 16, wherein said provided identification information is input from an external source.

21. The information reproducing method of claim 20, wherein said external source comprises user-operated means.

22. The information reproducing method of claim 16, further comprising the step of storing said provided identification information.

23. The information reproducing method of claim 16, wherein said provided identification information identifies the location of said contents on said storage medium associated therewith.

24. The information reproducing method of claim 16, wherein said broadcast information is selected based upon said provided identification information recorded on a storage medium.

25. An information providing method, comprising the steps of:

provision a storage medium in a remote unit, said storage medium including content information and at least one identification information indicative of said content information indicative of a software information in the remote unit, said software information and said provided identification information being stored at said information reproducing apparatus;

collecting payment for provision of said recording medium and for future receipt of updated information;

generating broadcast information;

receiving broadcast identification information indicative of said broadcast information from a source different from a source of said broadcast information, said broadcast information identification information being representative of a contents of said broadcast information;

transmitting said broadcast information to a broadcast station;

broadcasting said broadcast information, including said broadcast identification information from said broadcast station;

receiving said broadcast information; and downloading to said remote unit said broadcast information associated with said broadcast identification information if said broadcast identification information matches said provided information identification.

26. The information reproducing apparatus of claim 1, wherein said broadcast information is selected based upon said provided identification information recorded on a storage medium.

27. The information providing method of claim 25, wherein said broadcast information is selected based upon said provided identification information recorded on a storage medium.

* * * * *